United States Patent [19]

Sawada

[11] Patent Number: 5,335,021
[45] Date of Patent: Aug. 2, 1994

[54] LOGICAL COMB FILTER AND CHROMA SIGNAL SEPARATION CIRCUIT

[75] Inventor: Akira Sawada, Tokyo, Japan
[73] Assignee: NEC Corporation, Tokyo, Japan
[21] Appl. No.: 801,811
[22] Filed: Dec. 2, 1991

[30] Foreign Application Priority Data

Nov. 30, 1990 [JP] Japan .................. 2-340907
Feb. 13, 1991 [JP] Japan .................. 3-019614

[51] Int. Cl.$^5$ ............................................. H04N 9/64
[52] U.S. Cl. ............................... 348/664; 348/665; 348/713
[58] Field of Search .............. 358/31, 39, 40, 37, 358/329; H04N 9/64, 9/77

[56] References Cited

U.S. PATENT DOCUMENTS

| | | | |
|---|---|---|---|
| 4,851,898 | 7/1989 | Asahara | 358/31 |
| 4,961,108 | 10/1990 | Perlman | 358/31 |
| 5,051,818 | 9/1991 | Mishima | 358/31 |

Primary Examiner—James J. Groody
Assistant Examiner—Sherrie Hsia
Attorney, Agent, or Firm—Whitham, Curtis & Whitham

[57] ABSTRACT

A logical comb filter comprises a first delay circuit receiving an input composite video signal called a succeeding signal for delaying the received succeeding signal by one scan line period so as to output a main signal composed of the delayed succeeding signal, and a second delay circuit receiving the main signal for delaying the received main signal by one scan line period so as to output a preceding signal composed of the delayed main signal. An addition circuit is connected at its first input to receive the main signal. A selection and control circuit receives the succeeding signal, the main signal and the preceding signal for supplying the succeeding signal to a second input of the addition circuit when the relation of the main signal>(is greater than) the succeeding signal>the the preceding signal or the relation of the preceding signal>the succeeding signal>the main signal is satisfied. When the relation of the main signal>the preceding signal>the succeeding signal or the relation of the succeeding signal>the the preceding signal>the main signal is satisfied, the selection and control circuit supplies the preceding signal to the second input of the addition circuit. When the relation of the preceding signal>the main signal>the succeeding signal or the relation of the succeeding signal>the main signal>the preceding signal is satisfied, the selection and control circuit supplies the main signal to the second input of the addition circuit.

11 Claims, 6 Drawing Sheets

| OUTPUT OF COMPARATOR | | | LARGE/SMALL PATTERN OF SIGNALS | INPUTS OF ADDER | |
|---|---|---|---|---|---|
| 51 | 52 | 55 | | | |
| L | L | L | ◌⁀◌⁀◌ (down) | MAIN SIGNAL "d" | MAIN SIGNAL "d" |
| L | L | H | NOT EXIST | | |
| L | H | L | ◌⁀◌⁀◌ | PRECEDING SIGNAL "e" | MAIN SIGNAL "d" |
| L | H | H | ◌⁀◌⁀◌ | SUCCEEDING SIGNAL "c" | MAIN SIGNAL "d" |
| H | L | L | ◌⁀◌⁀◌ | SUCCEEDING SIGNAL "c" | MAIN SIGNAL "d" |
| H | L | H | ◌⁀◌⁀◌ | PRECEDING SIGNAL "e" | MAIN SIGNAL "d" |
| H | H | L | NOT EXIST | | |
| H | H | H | ◌⁀◌⁀◌ | MAIN SIGNAL "d" | MAIN SIGNAL "d" |

LOGICAL COMB FILTER AND CHROMA SIGNAL SEPARATION CIRCUIT

BACKGROUND OF THE INVENTION

1. Field of the Invention

The present invention relates to logical comb filter mainly used for a Y/C separation in video instruments such as a video tape recorder/reproducer, a television receiver, etc., and more specifically to a logical comb filter inexpensively constructed for processing a video signal in a digital manner. Furthermore, the present invention relates to a chroma signal separation signal constituted of such a logical comb filter, for separating a chroma signal from a NTSC composite video signal.

2. Description of related art

A logical comb filter for separating a chroma signal from a NTSC composite video signal has been basically composed of maximum value circuits and minimum value circuits. In the case that this filter is formed of an analog circuit, each of the maximum value circuits and the minimum value circuits can be formed of a simple circuit constituted of two transistors. However, In the case that this filter is formed of a digital circuit, the digital circuit does not generally have either the maximum value circuit or the minimum value circuit. Therefore, each of the maximum value circuits and the minimum value circuits is formed of a combination of NAND circuits and NOR circuits, or a combination of comparators and selectors. Ordinarily, comparators and selectors are used for constitute the maximum value circuits and the minimum value circuits.

Therefore, in the case that the logical comb filter is formed of an analog circuit, the logical comb filter can be constituted of a relatively small number of transistors, but in the case that the logical comb filter is formed of a digital circuit, the logical comb filter needs a considerable number of transistors. For example, assuming that the signal bit length is 8 bits in accordance with general digital processings, the comparators need 60 gates, and the selectors need 22 gates, and the whole of the filter requires 432 gates including addition circuits. In this connection, a CMOS gate needs four transistors for one gate.

Recently, the logical comb filters have been incorporated in domestic video tape recorder/reproducers. In view of mass productivity (no adjustment) and stability to change in time, inclination of forming the logical comb filter in the digital circuit is increasing. However, if the logical comb filter is formed in the digital circuit, the circuit size becomes large and expensive as mentioned above.

On the other hand, a chroma signal separation circuit includes a type in which the characteristics of the separation filter is changed on the basis of a large/small relation of chroma signal difference between a current line and a preceding line and a succeeding line.

For example, an input composite video signal is supplied to and delayed by a first one-line delay circuit, and then, an output of the first one-line delay circuit is supplied to and delayed by a second one-line delay circuit. In addition, the input composite video signal, the output of the first one-line delay circuit and an output of the second one-line delay circuit are inputted to first, second and third bandpass filters, respectively. Respective outputs of the first, second and third bandpass filters are called a "succeeding signal", a "main signal" and a "preceding signal", respectively.

The main signal and the succeeding signals are added to give a succeeding comb signal, and the main signal and the preceding signals are added to give a preceding comb signal. A mean value of the succeeding signal and the preceding signal gives a three-line comb signal. On the other hand, a difference between the main signal and the preceding signal gives a preceding difference signal, and a difference between the main signal and the succeeding signal gives a succeeding difference signal. One signal is selected from the preceding comb signal, the succeeding comb signal, and the three-line comb signal, on the basis of a selection signal which is obtained by multiplying the preceding difference signal and the succeeding difference signal by coefficients and by processing the result of the multiplication.

One conventional chroma signal separation circuit has been configured to select one of the preceding comb signal and the succeeding comb signal corresponding to a smaller one of the preceding difference signal and the succeeding difference signal, and to select the three-line comb signal if the preceding difference signal and the succeeding difference signal are substantially the same.

This conventional chroma signal separation circuit has been disadvantageous in which if the above mentioned coefficients are near to 1 (one), when a pattern of a three-line signal change of the preceding line, the current line and the succeeding line is a step form (in which the signal becomes larger or smaller in the order of the preceding line, the current line and the succeeding line), chattering occurs in switching of the comb signal. As a result, a picture of a finally displayed image becomes unnatural. Specifically, nonuniformity occurs in cross-color and dot obstruction, and therefore, a picture deterioration becomes remarkable in comparison with the case of no nonuniformity. On the other hand, if the coefficients are made sufficiently larger than 1 (one), when the signal change pattern is a pulse form (in which the main signal is larger or smaller than both of the preceding signal and the succeeding signal), a level variation occurs.

Another conventional chroma signal separation circuit has been so configured that the NTSC composite video signal is supplied to the bandpass filter and thereafter is supplied the above mentioned logical comb filter so as to obtain a chroma signal. In this conventional chroma signal separation circuit, when the three-line signal change pattern is the step form, no chattering occurs in the switching of the comb signals. However, the dot obstruction becomes to easily occur.

SUMMARY OF THE INVENTION

Accordingly, it is an object of the present invention to provide a logical comb filter and a chroma signal separation circuit which has overcome the above mentioned defect of the conventional one.

Another object of the present invention is to provide a logical comb filter in the form of a digital circuit composed of a reduced number of gates.

Still another object of the present invention is to provide a chroma signal separation circuit capable of causing to output a natural picture of a finally displayed image.

The above and other objects of the present invention are achieved in accordance with the present invention by a logical comb filter comprising a first delay circuit receiving an input signal called a succeeding signal for delaying the received succeeding signal by one scan line period so as to output a main signal composed of the delayed succeeding signal, a second delay circuit receiving the main signal for delaying the received main signal by one scan line period so as to output a preceding signal composed of the delayed main signal, an addition circuit having a first input connected to receive the main signal and a second input, and a selection and control circuit receiving the succeeding signal, the main signal and the preceding signal for supplying to the second input of the addition circuit a signal selected in accordance with the following condition:

the succeeding signal is selected when the relation of the main signal is greater than the succeeding signal is greater than the preceding signal or the relation of the preceding signal is greater than the succeeding signal is greater than the main signal is satisfied;

the preceding signal selected when the relation of the main signal is greater than the preceding signal is greater than the succeeding signal or the relation of the succeeding signal is greater than the preceding signal is greater than the main signal is satisfied; and the main signal is selected when the relation of the preceding signal is greater than the main signal is greater than the succeeding signal or the relation of the succeeding signal is greater than the main signal is greater than the preceding signal is satisfied.

Preferably, the logical comb filter further includes a mean value circuit receiving the succeeding signal and the main signal so as to output a mean value signal, and the selection and control circuit also receives the mean value signal and outputs the mean value signal to the second input of the addition circuit when the relation of the preceding signal is greater than the main signal is greater than the succeeding signal or the relation of the succeeding signal is greater than the main signal is greater than the preceding signal is satisfied.

With the above mentioned arrangement, the first input of the addition circuit is fixed to receive only the main signal, and the signal to be inputted to the second input of the addition circuit is determined on the basis of the mutual large/small relation of the succeeding signal, the main signal, and the preceding signal.

According another aspect of the present invention, there is provided a chroma signal separation circuit for separating a chroma signal from a composite video signal, comprising:

a first delay circuit receiving an input composite video signal called a succeeding signal for delaying the received succeeding signal by one scan line period so as to output a main signal composed of the delayed succeeding signal;

a second delay circuit receiving the main signal for delaying the received main signal by one scan line period so as to output a preceding signal composed of the delayed main signal;

a first addition circuit receiving the succeeding signal and the main signal for outputting a succeeding difference signal as the result of addition;

a second addition circuit receiving the main signal and the preceding signal for outputting a preceding difference signal as the result of addition;

a first absolute value circuit receiving the succeeding difference signal for outputting a succeeding difference absolute value signal;

a second absolute value circuit receiving the preceding difference signal for outputting a preceding difference absolute value signal;

a first coefficient circuit receiving the succeeding difference absolute value signal for multiplying the succeeding difference absolute value signal by a first coefficient K1 or a second coefficient K2 so as to generate a first multiplication signal;

a second coefficient circuit receiving the preceding difference absolute value signal for multiplying the prededing difference absolute value signal by the first coefficient K1 or the second coefficient K2 so as to generate a second multiplication signal;

a different sign detection circuit receiving the succeeding difference signal and the preceding difference signal for detecting consistency/inconsistency in positive/negative sign between the succeeding difference signal and the preceding difference signal so as to generate a different sign discrimination signal;

a first comparator receiving an output of the first coefficient circuit and the preceding difference absolute value signal for generating a first large/small discrimination signal;

a second comparator receiving an output of the second coefficient circuit and the succeeding difference absolute value signal for generating a second large/small discrimination signal;

a first selection circuit controlled by the different sign discrimination signal for controlling the first and second coefficient circuit so as to designate one of the first and second coefficients K1 and K2 to be multiplied;

a circuit receiving the succeeding signal, the main signal and the preceding signal for generating a preceding comb signal, a succeeding comb signal and a three-line comb signal;

a second selection circuit receiving the three-line comb signal and the preceding comb signal and controlled by the second large/small discrimination signal so as to select one of the three-line comb signal and the preceding comb signal; and a third selection circuit receiving an output of the second selector and the succeeding comb signal and controlled by the first large/small discrimination signal so as to output a selected one of the output of the third selection circuit and the succeeding comb signal, as a chroma signal.

According to a third aspect of the present invention, there is provided a chroma signal separation circuit for separating a chroma signal from a composite video signal, comprising:

a first delay circuit receiving an input composite video signal called a succeeding signal for delaying the received succeeding signal by one scan line period so as to output a main signal composed of the delayed succeeding signal;

a second delay circuit receiving the main signal for delaying the received main signal by one scan line period so as to output a preceding signal composed of the delayed main signal;

a first addition circuit receiving the succeeding signal and the main signal for outputting a succeeding difference signal as the result of addition;

a second addition circuit receiving the main signal and the preceding signal for outputting a preceding difference signal as the result of addition;

a first absolute value circuit receiving the succeeding difference signal for outputting a succeeding difference absolute value signal;

a second absolute value circuit receiving the preceding difference signal for outputting a preceding difference absolute value signal;

a different sign detection circuit receiving the succeeding difference signal and the preceding difference signal for detecting consistency/inconsistency in positive/negative sign between the succeeding difference signal and the preceding difference signal so as to generate a different sign discrimination signal;

a first coefficient circuit receiving the preceding difference absolute value signal for outputting an inverted preceding difference absolute value signal;

a third addition circuit receiving the succeeding difference absolute value signal and the inverted preceding difference absolute value signal for outputting an addition signal;

a positive sign detection circuit receiving the addition signal for detecting a positive sign of the addition signal so as to generate a positive sign discrimination signal;

a first selection circuit receiving the succeeding difference absolute value signal and the preceding difference absolute value signal and controlled by the positive sign discrimination signal so as to select one of the succeeding difference absolute value signal and the preceding difference absolute value signal;

a third absolute value circuit receiving the addition signal for outputting an absolute value signal of the addition signal;

a second coefficient circuit receiving an output of the first selection circuit for multiplying the output of the first selection circuit by a first coefficient K1 so as to generate a first multiplication signal;

a third coefficient circuit receiving the absolute value signal of the addition signal for multiplying the absolute value signal of the addition signal by a second coefficient K2 so as to generate a second multiplication signal;

a second selection circuit receiving the first multiplication signal and the output of the first selection circuit and controlled by the different sign discrimination signal so as to select one of the first multiplication signal and the output of the first selection circuit;

a third selection circuit receiving the absolute value signal of the addition signal and the second multiplication signal and controlled by the different sign discrimination signal so as to select one of the absolute value signal of the addition signal and the second multiplication signal;

a comparator receiving an output of the second selection circuit and an output of the third selection circuit for generating a large/small discrimination signal;

a circuit receiving the succeeding signal, the main signal and the preceding signal for generating a preceding comb signal, a succeeding comb signal and a three-line comb signal;

a fourth selection circuit receiving the succeeding comb signal and the preceding comb signal and controlled by the positive sign discrimination signal so as to select one of the succeeding comb signal and the preceding comb signal; and a fifth selection circuit receiving an output of the fourth selector and the three-line comb signal and controlled by the large/small discrimination signal so as to output a selected one of the output of the fourth selection circuit and the three-line comb signal, as a chroma signal.

The above and other objects, features and advantages of the present invention will be apparent from the following description of preferred embodiments of the invention with reference to the accompanying drawings.

DESCRIPTION OF THE PREFERRED EMBODIMENTS

Embodiment 1

Figure 1:
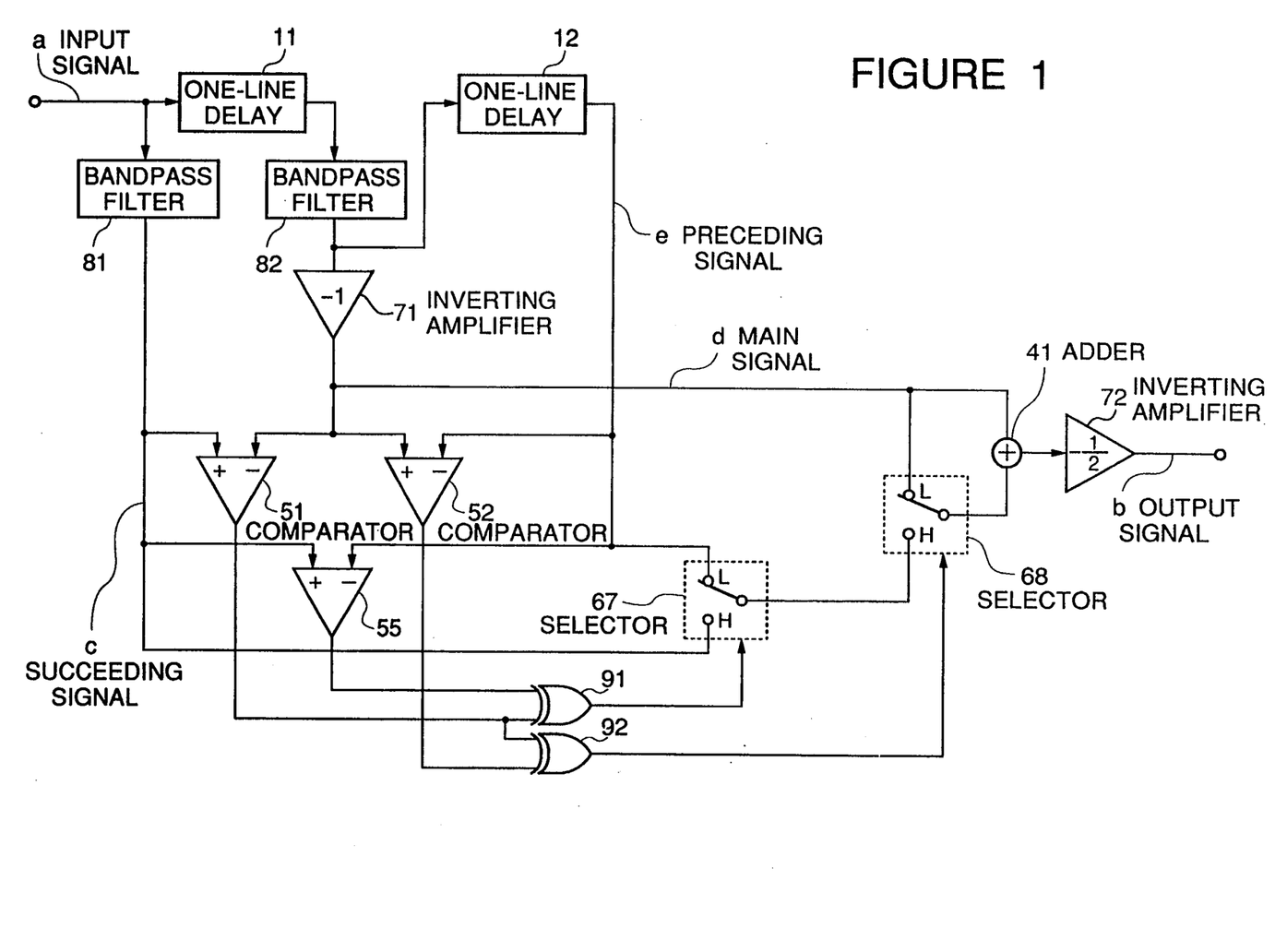
FIG. 1 is a block diagram of a first embodiment of the logical comb filter in accordance with the present invention.

Referring to FIG. 1, there is shown a block diagram of a first embodiment of the logical comb filter in accordance with the present invention. The shown filter can be used for separating a chroma signal from a composite video signal.

An input signal "a" such as a composite video signal is supplied to a bandpass filter 81 and a one-line delay circuit 11. An output "c" of the bandpass filter 81, called a "succeeding signal", is supplied to a non-inverting input (+) of comparators 51 and 55 and an input terminal "H" of a selector 67. An output of the one-line delay circuit 11 is inputted through another bandpass filter 82 to an input of an inverting amplifier 71 and another one-line delay circuit 12. An output "d" of the inverting amplifier 71, called a "main signal", is supplied to an inverting input (−) of the comparator 51, a non-inverting input (+) of a comparator 52, an input terminal "L" of a selector 68, and a first input of an adder 41. An output "e" of the one-line delay circuit 12, called a "preceding signal", is supplied to an inverting input (−) of the comparators 52 and 55 and an input terminal "L" of the selector 67.

An output of the selector 67 is connected to an input terminal "H" of the selector 68, and an output of the selector 68 is connected to a second input of the adder 41, whose output is supplied to an inverting amplifier 72. The inverting amplifier 72 generates an output signal "b", which can be used as a chroma signal when the shown filter is used for separating a chroma signal from a composite video signal.

Outputs of the two comparators 51 and 55 are inputted to an exclusive-OR circuit 91, which has an output connected to a selection control input of the selector 67. Similarly, outputs of the two comparators 51 and 52 are inputted to another exclusive-OR circuit 92, which has an output connected to a selection control input of the selector 68.

In the above mentioned arrangement, the bandpass filters 81 and 82 are located before and after the one-line delay circuit 11. The reason for this that the output of the one-line delay circuit 11 can be used for processing a luminance signal (not shown). Therefore, if the circuit is used for only the chroma signal separation, it is sufficient if only one bandpass filter is provided.

Now, operation of the circuit shown in FIG. 1 will be described on the basis of a large/small relation among the succeeding signal "c", the main signal "d" and the preceding signal "e".

First case: the main signal "d">the succeeding signal "c">the preceding signal "e" or the preceding signal "e">the succeeding signal "c">the main signal "d"

In this case, the output of the comparator 51 is a low level (L) and the output of the comparator 55 is a high level "H", or the output of the comparator 51 is a high level "H" and the output of the comparator 55 is a low level (L). In both of these two situations, the output of the exclusive-OR circuit 91 is brought into a high level "H", which controls the selector 67 so as to cause to select the input terminal "H", so that the succeeding signal "c" is selected by the selector 67 and outputted to input terminal "H" of the selector 68.

On the other hand, the output of the comparator 51 is a low level (L) and the output of the comparator 52 is a high level "H", or the output of the comparator 51 is a high level "H" and the output of the comparator 52 is a low level (L). In both of these two situations, the output of the exclusive-OR circuit 92 is brought into a high level "H", which controls the selector 68 so as to cause to select the input terminal "H", so that the succeeding signal "c" outputted from the selector 67 is selected and outputted to the adder 41. Therefore, the succeeding signal "c" and the main signal "d" are added by the adder 41, an output of which is outputted as the output signal "b" through the inverting amplifier 72.

Second case: the main signal "d">the preceding signal "e">the succeeding signal "c" or the succeeding signal "c">the preceding signal "d">the main signal "d"

In this case, both of the outputs of the comparators 51 and 55 are the high level "H" or the low level "L", and therefore, the output of the exclusive-OR circuit 91 becomes the low level "L". On the other hand, the output of the exclusive-OR circuit 92 is the high level "H", similarly to the first case. Therefore, the input terminal "L" of the selector 67, namely, the preceding signal "e", is outputted from the output of the selector 68. Accordingly, the main signal "d" and the preceding signal "e" are added by the adder 41.

Third case: the main signal "c">the preceding signal "d">the succeeding signal "e" or the succeeding signal "e">the preceding signal "e">the main signal "c"

In this case, both of the outputs of the comparators 51 and 52 are the high level "H" or the low level "L", and therefore, the output of the exclusive-OR circuit 92 becomes the low level "L". Therefore, the selector 67 selects its input terminal "L", namely, the main signal "d". Accordingly, the main signal "d" are applied to both the inputs of the adder 41.

Figure 4:
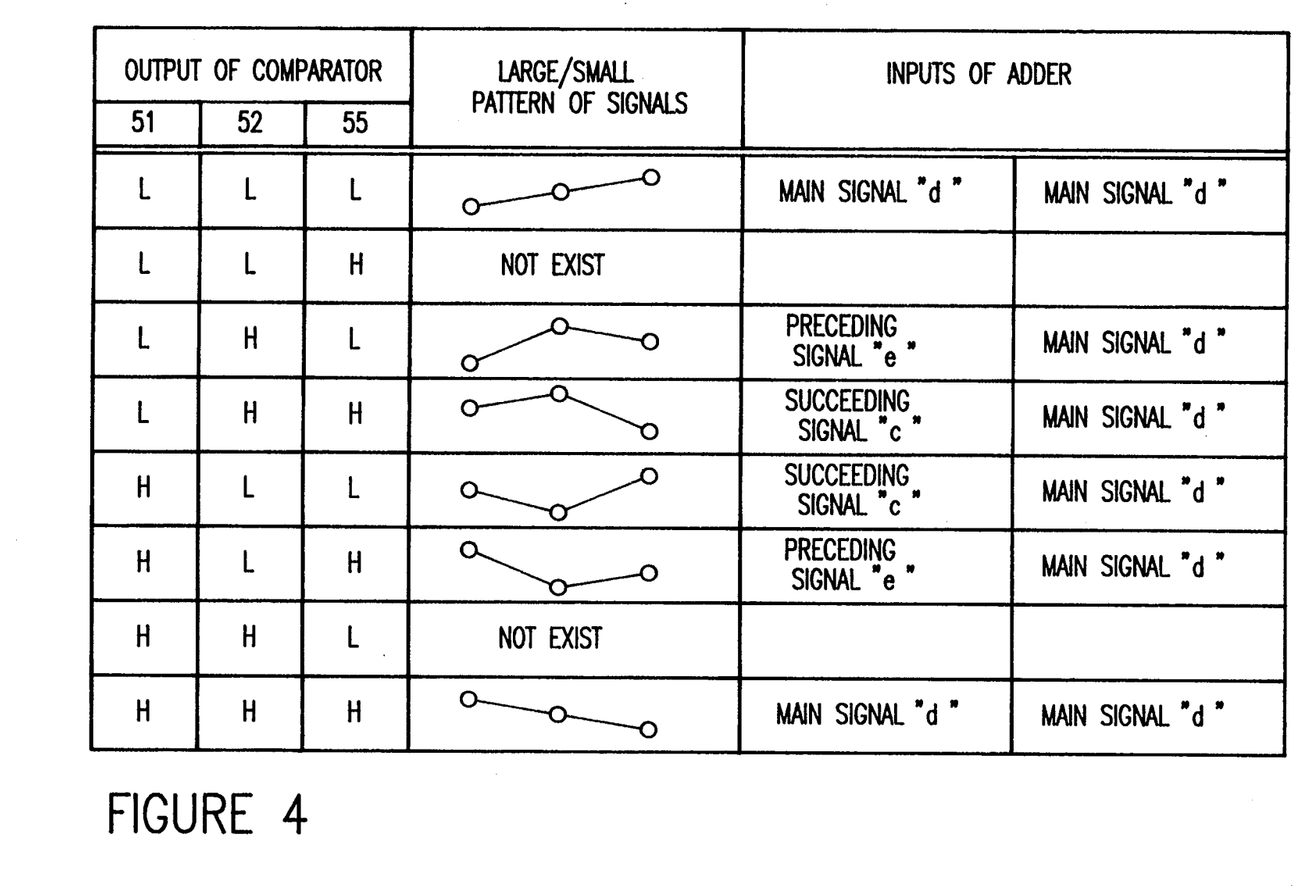
FIG. 4 illustrates an operation of the first embodiment of the logical comb filter in accordance with the present invention.

It will be explained with reference to FIG. 4 that the above mentioned operation is equivalent to a conventional logical comb filter. FIG. 4 illustrates the outputs of the comparators 51, 52 and 55; the large/small pattern of the signals "c", "d" and "e", and the two inputs of the adder of the conventional logical comb filter.

It will be seen that the main signal "d" is ceaseless supplied to either one of the two inputs of the adder, regardless of the large/small pattern of the signals "c", "d" and "e". This means that one input of the adder can be fixed to the main signal "d". On the other hand, a signal to be supplied to the other input of the adder can be selected from the succeeding signal "c", the main signal "d" and the preceding signal "e" on the basis of the large/small pattern of these signals "c", "d" and "e".

Embodiment 2

Figure 2:
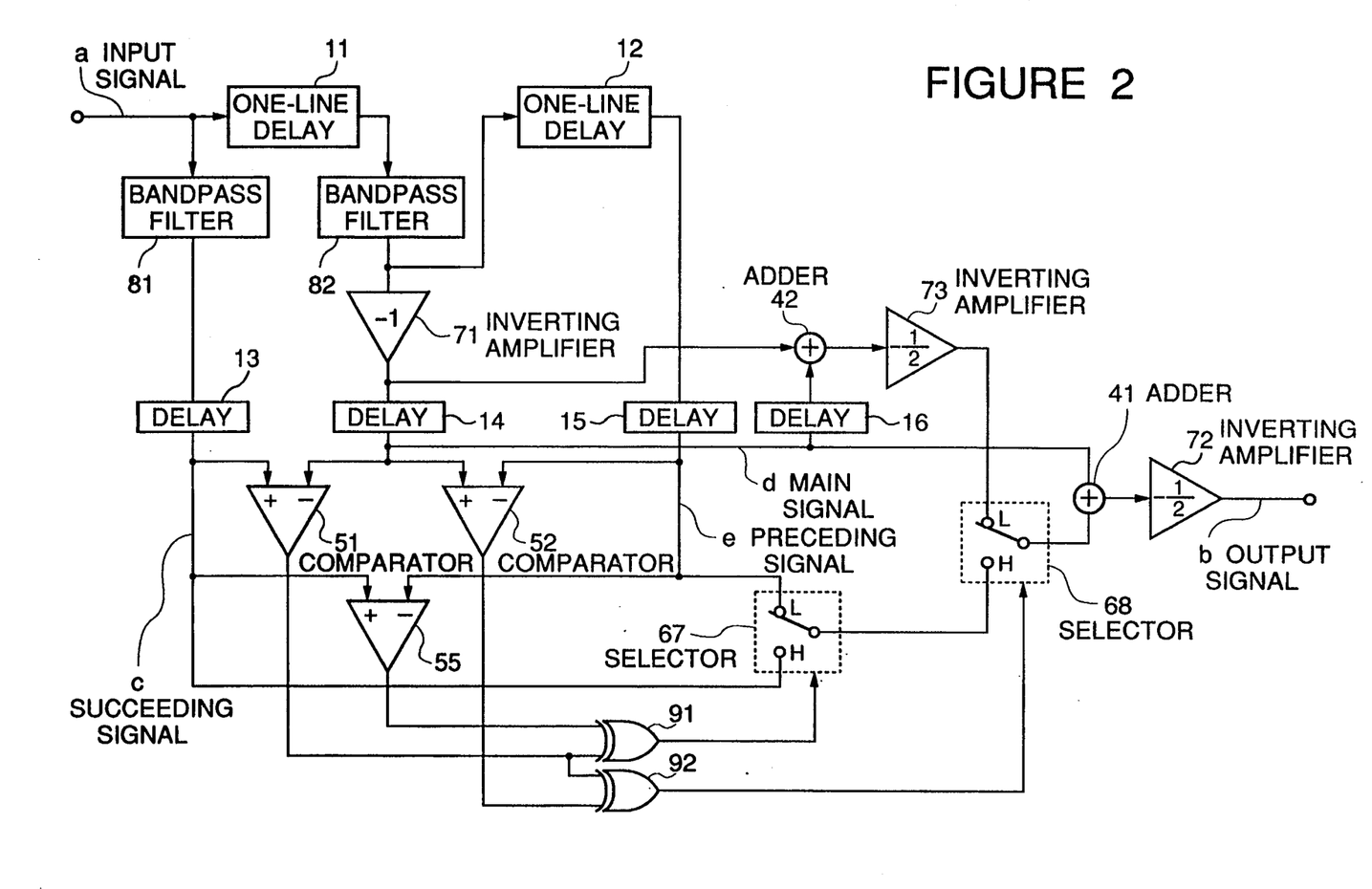
FIG. 2 is a block diagram of a second embodiment of the logical comb filter in accordance with the present invention.

Referring to FIG. 2, there is shown a block diagram of a second embodiment of the logical comb filter in accordance with the present invention. In FIG. 2, elements similar to those shown in FIG. 1 are given the same Reference Numerals, and explanation thereof will be omitted.

In the second embodiment, the output of the bandpass filter 81 is supplied through a delay circuit 13 to the non-inverting input (+) of comparators 51 and 55 and the input terminal "H" of a selector 67. The output of the inverting amplifier 71 is supplied through a delay circuit 14 to the inverting input (−) of the comparator 51, and the first input of the adder 41. The output of the one-line delay circuit 12 is supplied through a delay circuit 15 to the inverting input (−) of the comparators 52 and 55 and the input terminal "L" of the selector 67. In addition, an output of the delay circuit 14 is connected to a delay circuit 16, and an output of the delay circuit 16 and the output of the inverting amplifier 71 are supplied to and added by an adder 42, which in turn has an output connected through an inverting amplifier 73 to the input terminal "L" of the selector 68. Each of the delay circuits 13, 14, 15 and 16 serves to delay a phase of a chroma signal by 180°, which corresponds to 140 nanoseconds in the NTSC video signal.

Now, operation of the second embodiment will be explained. But, the following explanation will be limited to only points of the operation of the second embodiment different from that of the first embodiment.

The operation of the second embodiment is different from that of the first embodiment when the selector 68 selects the input terminal "L". In this case, the selector 68 of the first embodiment selects the main signal "d", but the selector 68 of the second embodiment selects a mean value signal of a 180° phase-advanced signal and a 180° phase-delayed signal of the main signal "d". Addition of this mean value signal and the main signal "d" by the adder 41 is equivalent to a bandpass filter processing. In the meanwhile, the bandpass filter 82 is intended to eliminate a low frequency band component of the luminance signal from the input signal "a", and therefore, the main signal "d" includes a high frequency band component of the luminance signal. When the selector 68 selects the input terminal "L", since the main signal "d" is outputted as the output signal "b" in the first embodiment shown in FIG. 1, the output signal "b" includes a luminance signal component. On the other hand, in the second embodiment, since the bandpass filter is equivalently added to the input terminal "L" of the selector 68, the luminance signal component included in the output signal "b" is effectively decreased or suppressed.

Embodiment 3

Figure 3:
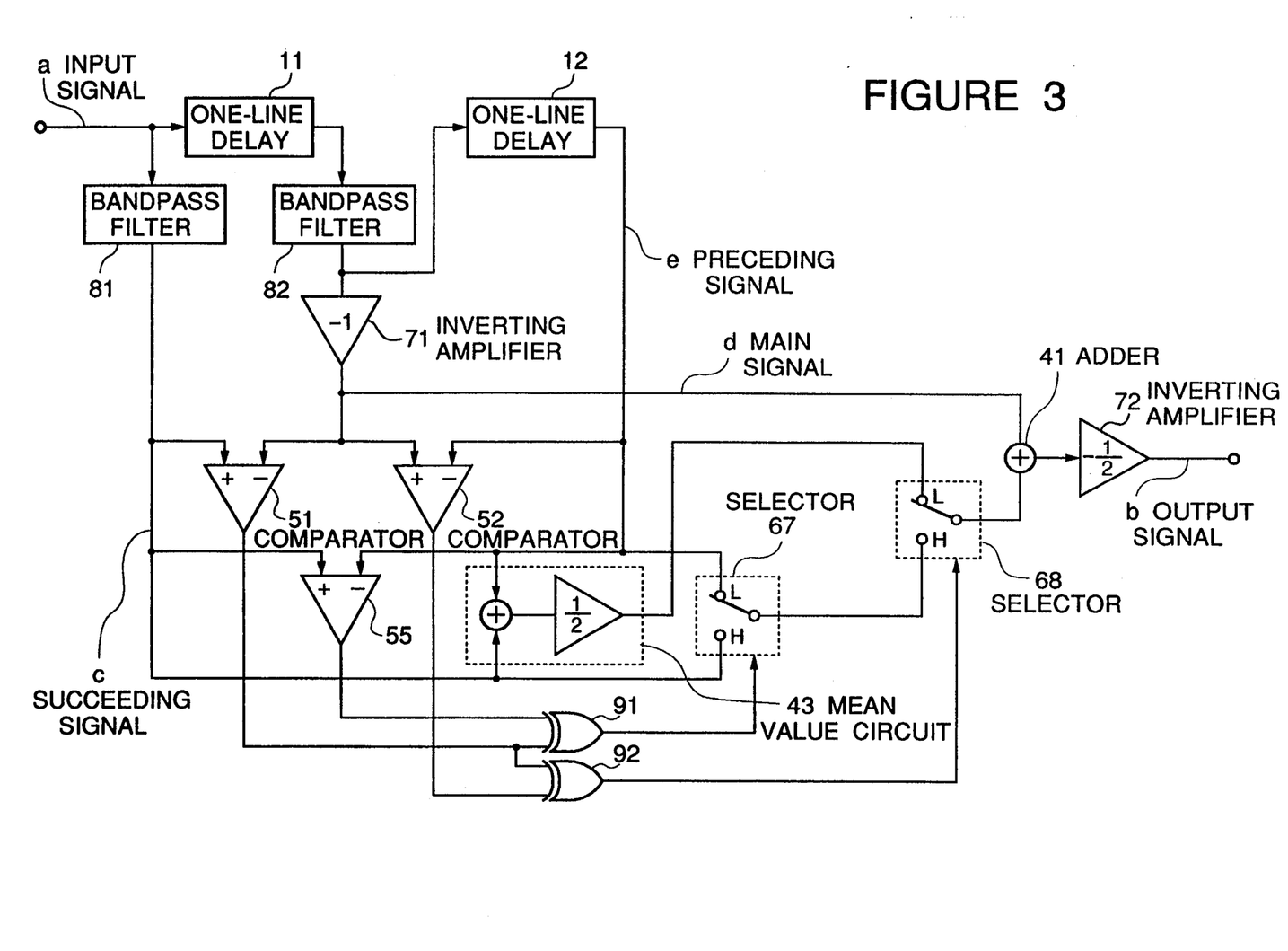
FIG. 3 is a block diagram of a third embodiemnt of the logical comb filter in accordance with the present invention.

Referring to FIG. 3, there is shown a block diagram of a third embodiment of the logical comb filter in accordance with the present invention. In FIG. 3, elements similar to those shown in FIG. 1 are given the same Reference Numerals, and explanation thereof will be omitted.

The third embodiment is different from the first embodiment, in that the succeeding signal "c" and the preceding signal "e" are supplied to a mean value circuit 43, which has an output connected to the input terminal "L" of the selector 68. When the selector 68 selects its input terminal "L", the shown filter has a comb filter characteristics expressed by the following equation:

$$\text{Gain} = |\cos(2\pi f/f_H) - 1|$$

where $f_H$ is a horizontal scanning frequency

If the input signal "a" has a frequency which is an integer number times of $f_H$, the gain becomes zero. Since the spectrum of the luminance component of the video signal is at a frequency which is an integer number times of $f_H$, the third embodiment is effective in suppressing the luminance component. Namely, the luminance component included in the output signal "b" can be decreased in comparison with the first embodiment.

Embodiment 4

Figure 5:
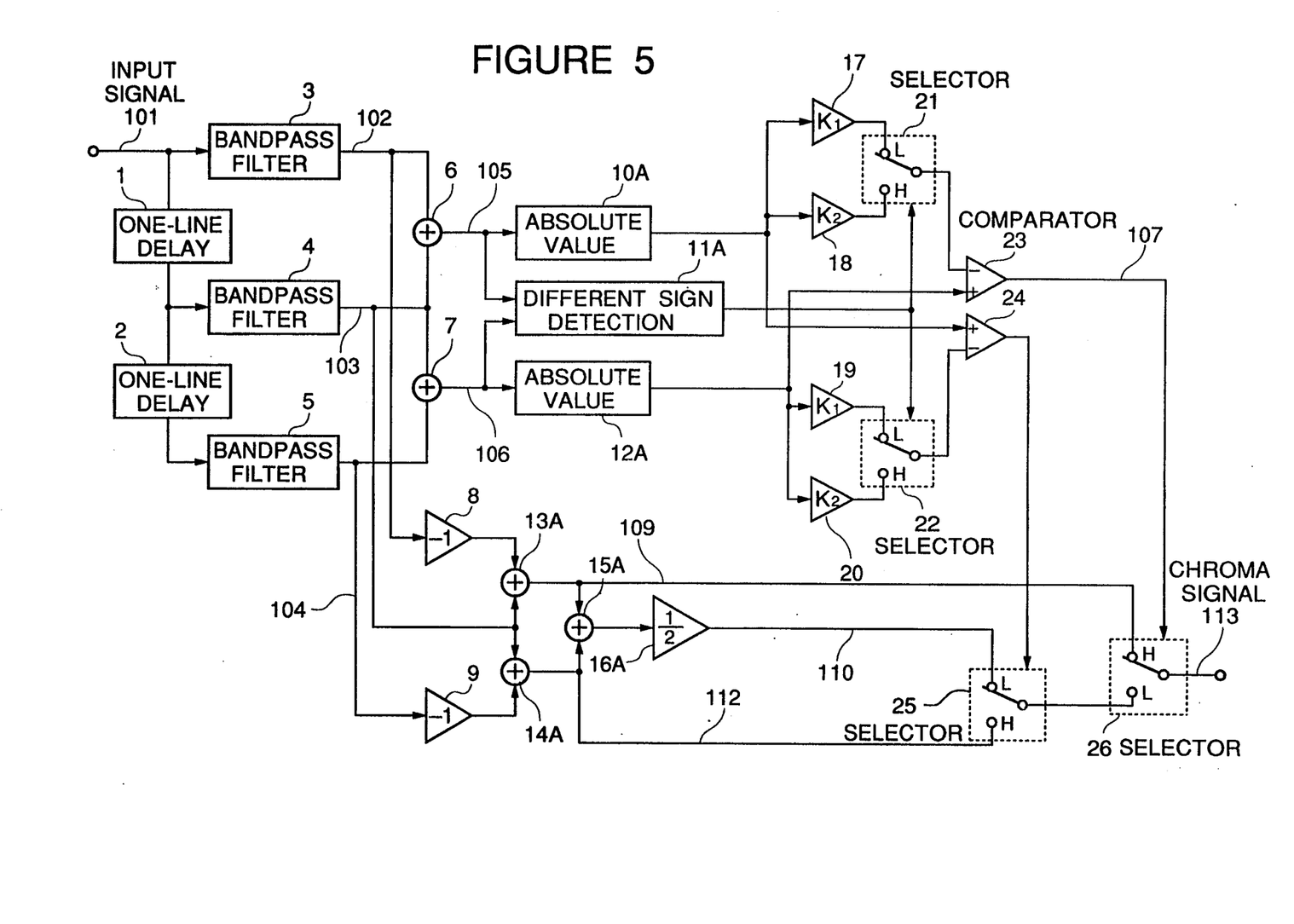
FIG. 5 is a block diagram of a first embodiment of the chroma signal separation circuit in accordance with the present invention.

Referring to FIG. 5, there is shown a block diagram of a first embodiment of the chroma signal separation circuit in accordance with the present invention.

An input signal 101 such as a composite video signal is supplied to a one-line delay circuit 1, whose output is supplied to another one-line delay circuit 2. The input signal and outputs of the two one-line delay circuits 1 and 2 are supplied to three bandpass filters 3, 4 and 5, respectively. The bandpass filters 3, 4 and 5 have the same bandpass characteristics having a center frequency of a color subcarrier frequency (3.58 MHz) so as to eliminate a frequency band component in which no chroma signal exists Outputs 102, 103 and 104 of the three bandpass filters 3, 4 and 5 are called a "succeeding signal", a "main signal" and a "preceding signal", respectively, similarly to the preceding embodiments. These signals are also called a frequency-separated chroma signal which includes a chroma signal component mixed with a luminance component around 3,58 MHz.

The succeeding signal 102 is inverted by a coefficient circuit 8, and then, added with the main signal 103 by an adder 13A, which generates a succeeding comb signal 109. Similarly, the preceding signal 104 inverted by a coefficient circuit 9, and the, added with the main signal 103 by an adder 14A, which generates a preceding comb signal 112.

The succeeding comb signal 109 and the preceding comb signal 112 are added by an adder 15A and supplied to a coefficient circuit 16A, so that a means value of the succeeding comb signal 109 and the preceding comb signal 112 outputted as a three-line comb signal 110. The succeeding comb signal 109, the three-line comb signal 110 and the preceding comb signal 112 can be deemed as a chroma signal, since the luminance component is sufficiently attenuated. However, because of a vertical correlation property of the image, the matter about which of the succeeding comb signal 109, the three-line comb signal 110 and the preceding comb signal 112 is an optimum signal, changes. Therefore, selectors 25 and 26 are provided to select, as a chroma signal 113, one of the succeeding comb signal 109, the three-line comb signal 110 and the preceding comb signal 112. Namely, the three-line comb signal 110 and the preceding comb signal 112 are supplied to input terminals "L" and "H" of the selector 25, respectively, and the succeeding comb signal 109 and an output of the selector 25 are supplied to input terminals "H" and "L" of the selector 26, respectively.

In the following, a section for generating control signals for the selectors 25 and 26 will be explained.

The succeeding signal 102 and the main signal 103 are added by an adder 6 so as to generate a succeeding difference signal 105, which is supplied to an absolute value circuit 10A. Similarly, the preceding signal 104 and the main signal 103 are added by an adder 7 so as to generate a preceding difference signal 106, which is supplied to another absolute value circuit 12A. Here, the adders 6 and 7 output a difference signal, because the chroma signal has a property in which the chroma signal is inverted in polarity by the one line delay.

The succeeding difference signal 105 and the preceding difference signal 106 are inputted to a different sign detection circuit 11A, which has an output connected to a selection control input of selectors 21 and 22. An absolute value signal of the succeeding difference signal 105 outputted from the absolute value circuit 10A is supplied to coefficient circuits 17 and 18 and a non-inverting input (+) of an comparator 24. On the other hand, an absolute value signal of the preceding difference signal 106 outputted from the absolute value circuit 12A is supplied to coefficient circuits 19 and 20 and a non-inverting input (+) of an comparator 23. Either of outputs of the coefficient circuits 17 and 18 is selected by a selector 21, so that the selected one is inputted to an inverting input (−) of the comparator 23. Either of outputs of the coefficient circuits 19 and 20 is selected by a selector 22 so that the selected one is inputted to an inverting input (−) of the comparator 24. An output of the comparator 23 is supplied to the selection control input of the selector 26, and an output of the comparator 24 is supplied to the selection control input of the selector 25.

Now, operation of the circuit shown in FIG. 5 will be explained. When the sign of the succeeding difference signal 105 is consistent with the sign of the preceding difference signal 106, the difference sign detection circuit 11A brings its output to a low level (L), so that the selectors 21 and 22 select their input terminal "L". The comparator 23 compares the absolute value signal of the preceding difference signal 106 and the K1 multiplied signal of the absolute value signal of the succeeding difference signal 105. Similarly, the comparator 24 compares the absolute value signal of the succeeding difference signal 105 and the K1 multiplied signal of the absolute value signal of the preceding difference signal 106.

On the other hand, when the sign of the succeeding difference signal 105 is not consistent with the sign of the preceding difference signal 106, the difference sign detection circuit 11A brings its output to a high level (H), so that the selectors 21 and 22 select their input terminal "L". Therefore, the comparator 23 compares the absolute value signal of the preceding difference signal 106 and the K2 multiplied signal of the absolute value signal of the succeeding difference signal 105. Similarly, the comparator 24 compares the absolute value signal of the succeeding difference signal 105 and the K2 multiplied signal of the absolute value signal of the preceding difference signal 106.

The comparator 23 generates a succeeding selection signal 107 as the result of comparison. If the K1 or K2 multiplied signal of the absolute value signal of the succeeding difference signal 105 is smaller than the absolute value signal of the preceding difference signal 106, the succeeding selection signal 107 causes the selector 26 to select its input terminal "H" so that the succeeding comb signal 109 is selected as the chroma signal. Similarly, the comparator 24 generates a preceding selection signal 108 as the result of comparison. If the K1 or K2 multiplied signal of the absolute value signal of the preceding difference signal 106 is smaller than the absolute value signal of the succeeding difference signal 105, the succeeding selection signal 108 causes the selector 25 to select its input terminal "H" so that the preceding comb signal 112 is selected as the chroma signal. If neither the succeeding comb signal 109 nor the preceding comb signal 112 is selected, the three-line comb signal 110 is selected. Thus, the selector 26 outputs the desired chroma signal 113.

Incidentally, a value near to 1 (one) is selected as an actual value of the coefficient K1. In this connection, if a value suitable to a binary coding, such as 5/4, 9/8, 17/16, etc., is selected, the amount of hardware for the coefficient circuits 17 and 19 can be reduced. On the other hand, a value larger than 1 (one) is selected as an actual value of the coefficient K2. In this connection, if a power of 2 such as 2, 4, 8, etc., is selected, the coefficient circuits 18 and 20 can be realized by a bit shift, and therefore, the hardware substantially becomes unnecessary.

Embodiment 5

Figure 6:
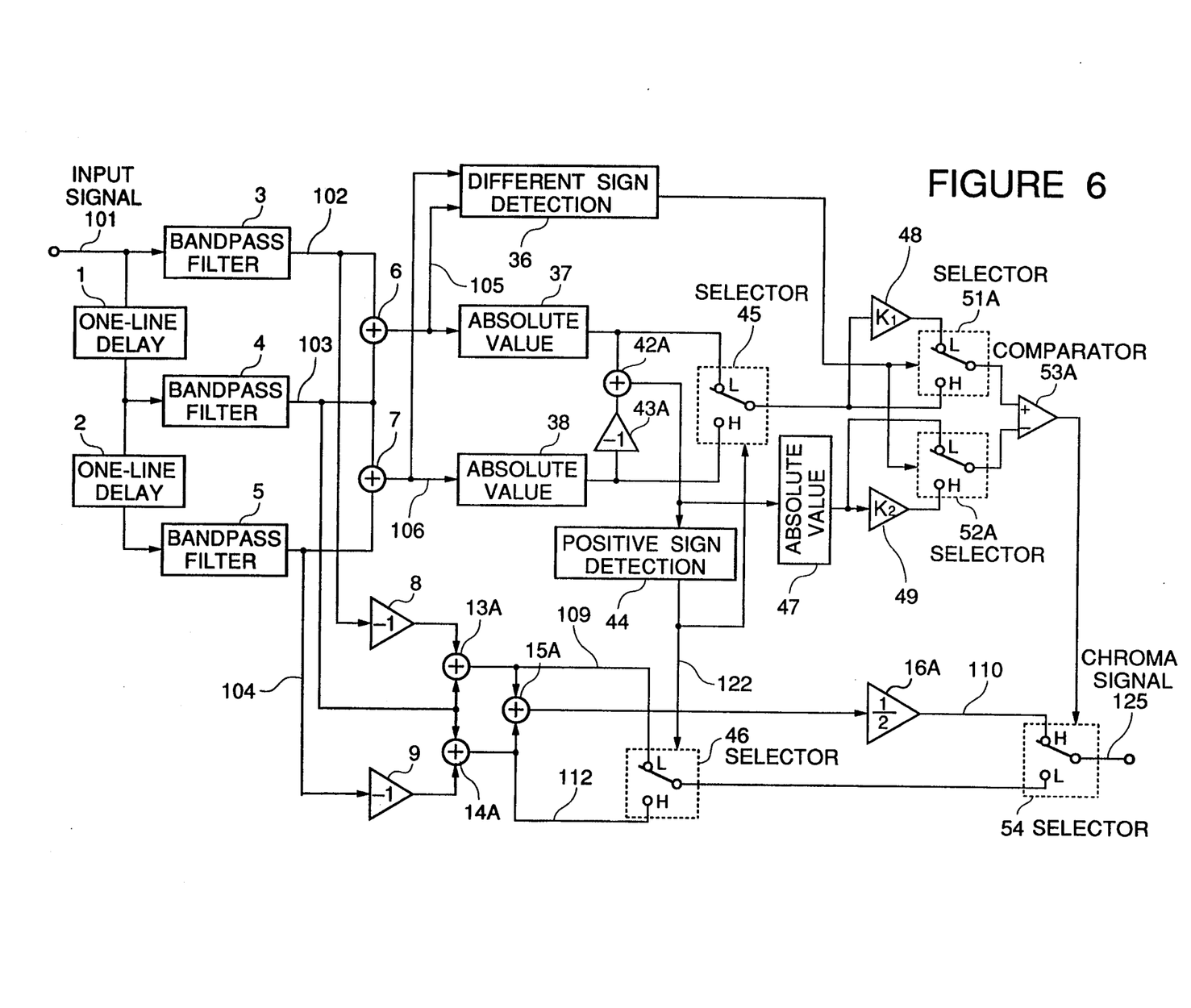
FIG. 6 is a block diagram of a second embodiment of the chroma signal separation circuit in accordance with the present invention.

Referring to FIG. 6, there is shown a block diagram of a second embodiment of the chroma signal separation circuit in accordance with the present invention. In FIG. 6, elements similar to those shown in FIG. 5 are given the same Reference Numerals, and therefore, only portion different from the embodiment shown in FIG. 5 will be explained.

An output of an absolute value circuit 37 is supplied to an input terminal "L" of a selector 45 and one input of an adder 42A. An output of an absolute value circuit 38 is supplied to an input terminal "H" of the selector 45 and through a coefficient circuit 43A to the other input of the adder 42A. An output of the adder 42A is supplied to a positive sign detection circuit 44 and an absolute value circuit 47. An output of the positive sign detection circuit 44 is connected to a selection control input of selectors 45 and 46. An output of the absolute value circuit 47 is connected to an input terminal "L" of a selector 52A and also through a coefficient circuit 49 to an input terminal "H" of a selector 52A. An output of the selector 45 is connected to an input terminal "H" and also through a coefficient circuit 48 to an input terminal "L" of the selector 51A. Outputs of the selectors 51A and 52A are compared by a comparator 53A concerning a large/small relation, and an output of the comparator 53A is connected to the selection control input of the selector 54. The selector 54 has an input terminal "H" connected to receive the three-line comb signal 110 and an input terminal "L" connected to an output of the selector 46, which in turn has an input terminal "L" connected to receive the succeeding comb signal 109 and an input terminal "H" connected to receive the preceding comb signal 112.

Next, an operation of the circuit shown in FIG. 6 will be described. The large/small relation of the absolute value signals of the succeeding difference signal 105 and the preceding difference signal 106 are discriminated by the coefficient circuit 43A, the adder 42A and the positive sign detection circuit 44, and a smaller one of the absolute value signals of the succeeding difference signal 105 and the preceding difference signal 106 is selected by the selector 45. Simultaneously, the selector 46 is controlled by the output of the positive sign detection circuit 44 in such a manner that if the absolute value signal of the preceding difference signal is smaller than the absolute value signal of the succeeding difference signal, the preceding comb signal 112 is selected, and if the absolute value signal of the succeeding difference signal is smaller than the absolute value signal of the preceding difference signal, the succeeding comb signal 109 is selected.

On the other hand, whether or not the sign of the succeeding difference signal 105 and the sign of the preceding difference signal 106 are consistent, is discriminated by the different sign detection circuit 36. If the signs are consistent, the selectors 51A and 52A are controlled to select their input terminal "L". If the signs are not consistent, the selectors 51A and 52A are controlled to select their input terminal "H".

With this arrangement, when the change of the succeeding signal 102, the main signal 103 and the preceding signal 104 is the pulse form, the K1 multiplied signal of a smaller one of the absolute value signal of the succeeding difference signal 105 and the absolute value signal of the preceding difference signal 106 is compared by the comparator 53A with the difference signal between the absolute value signal of the succeeding difference signal 105 and the absolute value signal of the preceding difference signal 106.

On the other hand, when the change of the succeeding signal 102, the main signal 103 and the preceding signal 104 is the step form, a smaller one of the absolute value signal of the succeeding difference signal 105 and the absolute value signal of the preceding difference signal 106 is compared by the comparator 53A with the K2 multiplied signal of the difference signal between the absolute value signal of the succeeding difference signal 105 and the absolute value signal of the preceding difference signal 106.

When the K2 multiplied signal of the difference signal between the absolute value signal of the succeeding difference signal 105 and the absolute value signal of the preceding difference signal 106 is smaller, namely, when the succeeding difference signal 105 and the preceding difference signal 106 are substantially the same, the comparator 53A operates to cause the selector 54 to select its input terminal "H" so that the three-line comb signal 110 is selected. Thus, the desired chroma signal 125 is outputted from the selector 54, similarly to the embodiment shown in FIG. 5.

In the embodiment shown in FIG. 6, it is possible to select $\frac{1}{2}^n$ (n=positive integer) as the coefficients K1 and K2, and therefore, it is also possible to make the hardware for the coefficient circuits 48 and 49 unnecessary. In addition, since one comparator is omitted in comparison with the embodiment shown in FIG. 5, the cost for the hardware can be furthermore reduced.

On the other hand, the manner for selecting the coefficients is different between the embodiments shown in FIGS. 5 and 6. If $\frac{1}{8}$ or 1/16 is selected as K1 in the embodiment shown in FIG. 6, the value of K1 in the embodiment shown in FIG. 5 is 1.12 and 1.06, respectively. Similarly, If 1 or $\frac{1}{2}$ is selected as K2 in the embodiment shown in FIG. 6, the value of K2 in the embodiment shown in FIG. 5 is 2 and 3, respectively.

As seen from the above description of the embodiments, the logical comb filter in accordance with the present invention makes it possible to constitute a circuit having the same performance as that of the conventional one, by reducing the required circuit elements by one comparator and four selectors. On the other hand, an added circuit element is only two exclusive-OR circuits. As a result, 142 gates can be reduced. Accordingly, the logical comb filter can be constructed with a cost more inexpensive than that for the conventional one.

In addition, in the case of improving the characteristics, the conventional one requires to separately add the bandpass filter or the comb filter. On the other hand, an addition circuit can be used in common. Therefore, the cost corresponding to one addition circuit (60 gates) can be reduced.

Furthermore, the chroma signal separation circuit in accordance with the present invention switches an coefficient to another by detecting whether the three line signal change pattern is in the pulse form or in the step form. With this arrangement, even if the comb signal switching chatters, it is possible to select the coefficient which can suppress the level variation, so that the finally displayed picture becomes natural. For example, in a scene of green grass of a grassy plain waving by a strong wind, or in a scene of swaying golden wheat ears, even if a cross color or dot obstruction occurs, the unnaturality can becomes inconspicuous.

The invention has thus been shown and described with reference to the specific embodiments. However, it should be noted that the present invention is in no way limited to the details of the illustrated structures but changes and modifications may be made within the scope of the appended claims.

I claim:

1. A logical comb filter comprising a first delay circuit receiving an input signal called a succeeding signal for delaying the received succeeding signal by one scan line period so as to output a main signal composed of the delayed succeeding signal, a second delay circuit receiving said main signal for delaying the received main signal by one scan line period so as to output a preceding signal composed of the delayed main signal, an addition circuit having a first input connected to receive said main signal and a second input, and a selection and control circuit receiving said succeeding signal, said main signal and said preceding signal for supplying to said second input of said addition circuit a signal selected in accordance with the following condition:

said succeeding signal is selected when the relation of said main signal is greater than said succeeding signal is greater than said preceding signal or the relation of said preceding signal is greater than said succeeding signal is greater than said main signal is satisfied;

said preceding signal selected when the relation of said main signal is greater than said preceding signal is greater than said succeeding signal or the relation of said succeeding signal is greater than said preceding signal is greater than said main signal is satisfied; and said main signal is selected when the relation of said preceding signal is greater than said main signal is greater than said succeeding signal or the relation of said succeeding signal is greater than said main signal is greater than said preceding signal is satisfied;

further including a mean value circuit receiving said succeeding signal and said preceding signal so as to output a mean value signal, and wherein said selection and control circuit also receives said mean value signal and outputs said mean value signal to said second input of said addition circuit when the relation of said preceding signal is greater than said main signal is greater than said succeeding signal or the relation of said succeeding signal is greater than said main signal is greater than said preceding signal is satisfied.

2. A chroma signal separation circuit for separating a chroma signal form a composite video signal, comprising:

a first delay circuit receiving an input composite video signal called a succeeding signal for delaying the received succeeding signal by one scan line period so as to output a main signal composed of the delayed succeeding signal;

a second delay circuit receiving said main signal for delaying the received main signal by one scan line period so as to output a preceding signal composed of the delayed main signal;

a first addition circuit receiving said succeeding signal and said main signal for outputting a succeeding difference signal as the result of addition;

a second addition circuit receiving said main signal and said preceding signal for outputting a preceding difference signal as the result of addition;

a first absolute value circuit receiving said succeeding difference signal for outputting a succeeding difference absolute value signal;

a second absolute value circuit receiving said preceding difference signal for outputting a preceding difference absolute value signal;

a first coefficient circuit receiving said succeeding difference absolute value signal for multiplying said succeeding difference absolute value signal by a first coefficient K1 or a second coefficient K2 so as to generate a first multiplication signal;

a second coefficient circuit receiving said preceding difference absolute value signal for multiplying said preceding difference absolute value signal by the first coefficient K1 or the second coefficient K2 so as to generate a second multiplication signal;

a different sign detection circuit receiving said succeeding difference signal and said preceding difference signal for detecting consistency/inconsistency in positive/negative sign between said succeeding difference signal and said preceding difference signal so as to generate a different sign discrimination signal;

a first comparator receiving an output of said first coefficient circuit and said preceding difference absolute value signal for generating a first large/small discrimination signal;

a second comparator receiving an output of said second coefficient circuit and said succeeding difference absolute value signal for generating a second large/small discrimination signal;

a first selection circuit controlled by said different sign discrimination signal for controlling said first and second coefficient circuit so as to designate one of said first and second coefficients K1 and K2 to be multiplied;

a circuit receiving said succeeding signal, said main signal and said preceding signal for generating a preceding comb signal, a succeeding comb signal and a three-line comb signal;

a second selection circuit receiving said three-line comb signal and said preceding comb signal and controlled by said second large/small discrimination signal so as to select one of said three-line comb signal and said preceding comb signal; and a third selection circuit receiving an output of said second selection circuit and said succeeding comb signal and controlled by said first large/small discrimination signal so as to output a selected one of said output of said third selection circuit and said succeeding comb signal, as a chroma signal.

3. A chroma signal separation circuit for separating a chroma signal from a composite video signal, comprising:

a first delay circuit receiving an input composite video signal called a succeeding signal for delaying the received succeeding signal by one scan line period so as to output a main signal composed of the delayed succeeding signal;

a second delay circuit receiving said main signal for delaying the received main signal by one scan line period so as to output a preceeding signal composed of the delayed main signal;

a first addition circuit receiving said succeeding signal and said main signal for outputting a succeeding difference signal as the result of addition;

a second addition circuit receiving said main signal and said preceding signal for outputting a preceding difference signal as the result of addition;

a first absolute value circuit receiving said succeeding difference signal for outputting a succeeding difference absolute value signal;

a second absolute value circuit receiving said preceding difference signal for outputting a preceding difference absolute value signal;

a different sign detection circuit receiving said succeeding difference signal and said preceding difference signal for detecting consistency/inconsistency in positive/negative sign between said succeeding difference signal and said preceding difference signal so as to generate a different sign discrimination signal;

a first coefficient circuit receiving said preceding difference absolute value signal for outputting an inverted preceding difference absolute value signal;

a third addition circuit receiving said succeeding difference absolute value signal and said inverted preceding difference absolute value signal for outputting an addition signal;

a positive sign detection circuit receiving said addition signal for detecting a positive sign of said addition signal so as to generate a positive sign discrimination signal;

a first selection circuit receiving said succeeding difference absolute value signal and said preceding difference absolute value signal and controlled by said positive sign discrimination signal so as to select one of said succeeding difference absolute value signal and said preceding difference absolute value signal;

a third absolute value circuit receiving said addition signal for outputting an absolute value signal of said addition signal;

a second coefficient circuit receiving an output of said first selection circuit for multiplying said output of said first selection circuit by a first coefficient K1 so as to generate a first multiplication signal;

a third coefficient circuit receiving said absolute value signal of said addition signal for multiplying said absolute value signal of said addition signal by a second coefficient K2 so as to generate a second multiplication signal;

a second selection circuit receiving said first multiplication signal and said output of said first selection circuit and controlled by said different sign discrimination signal so as to select one of said first multiplication signal and said output of said first selection circuit;

a third selection circuit receiving said absolute value signal of said addition signal and said second multiplication signal and controlled by said different sign discrimination signal so as to select one of said absolute value signal of said addition signal and said second multiplication signal;

a comparator receiving an output of said second selection circuit and an output of said third selection circuit for generating a large/small discrimination signal;

a circuit receiving said succeeding signal, said main signal and said preceding signal for generating a preceding comb signal, a succeeding comb signal and a three-line comb signal;

a fourth selection circuit receiving said succeeding comb signal and said preceding comb signal and controlled by said positive sign discrimination signal so as to select one of said succeeding comb signal and said preceding comb signal; and a fifth selection circuit receiving an output of said fourth selection circuit and said three-line comb signal and controlled by said large/small discrimination signal so as to output a selected one of said output of said fourth selection circuit and said three-line comb signal, as a chroma signal.

4. A logical comb filter comprising input means for deriving first, second and third signals from an input signal including a first delay circuit receiving an input signal for delaying the received input signal by one scan line period to produce a main signal composed of the delayed input signal, a second delay circuit receiving said main signal for delaying the received main signal by one scan line period to produce a preceding signal composed of the delayed main signal, said first, second and third signals being derived from said input signal, said main signal and said preceding signal, discrimination means for receiving said first, second and third signals for producing first, second and third discrimination signals, control signal generating means for generating first and second control signals in response to said first, second and third discrimination signals, and a selection circuit means for receiving said first, second and third signals and controlled by said first and second control signals for selecting said second signal in response to a first state of said first control signal, and for selecting either said third signal or said first signal in accordance with said second control signal and a second state of said first control signal.

5. A logical comb filter as recited in claim 4, wherein said control signal generating means includes a first exclusive-OR circuit receiving said first and second discrimination signals and generating said first control signal in response thereto, and a second exclusive-OR circuit receiving said second and third discrimination signals and generating said second control signal in response thereto, and wherein said first state of said first control signal indicates coincidence of said first and second discrimination signals and said second state of said first control signal indicate inconsistency of said first and second discrimination signals.

6. A logical comb filter as recited in claim 4, wherein said first, second and third signals are said input signal, said main signal and said preceding signal, respectively.

7. A logical comb filter as recited in claim 4, wherein said discrimination means includes
a first comparison circuit receiving and comparing said second signal and said third signal for generating said first discrimination signal, a second comparison circuit receiving and comparing said second signal and said first signal for generating said second discrimination signal, a third comparison circuit receiving and comparing said third signal and said first signal for generating said third discrimination signal.

8. A logical comb filter comprising a first delay circuit receiving an input signal for delaying the received input signal by one scan line period so as to output a main signal composed of the delayed input signal, a second delay circuit receiving said main signal for delaying the received main signal by one scan line period so as to output a preceding signal composed of the delayed main signal, a first comparison circuit receiving and comparing said main signal and said preceding signal for generating a first large/small discrimination signal, a second comparison circuit receiving and comparing said main signal and said input signal for generating a second large/small discrimination signal, a third comparison circuit receiving and comparing said preceding signal and said input signal for generating a third large/small discrimination signal, a first exclusive-OR circuit receiving said first and second large/small discrimination signals, a second exclusive-OR circuit receiving said second and third large/small discrimination signals, a selection circuit receiving said input signal, said main signal and said preceding signal and controlled by outputs of said first and second exclusive-OR circuits so as to select said main signal when the output of said first exclusive-OR circuit indicates coincidence, and to select either said preceding signal or said input signal in accordance with the output of said second exclusive-OR circuit when the output of said first exclusive-OR circuit indicates inconsistency, and an addition circuit receiving said main signal and an output of said selection circuit for outputting a result of addition as an output signal.

9. A logical comb filter as recited in claim 4, further including
an addition circuit receiving an output of said selection circuit means and said second signal for outputting a result of addition as an output signal.

10. A logical comb filter as recited in claim 9, wherein said second signal is said main signal.

11. A logical comb filter comprising
input means for deriving a main signal and a preceding signal from an input signal including a first delay circuit receiving an input signal for delaying the received input signal by one scan line period to produce said main signal composed of the delayed input signal, a second delay circuit receiving said main signal for delaying the received main signal by one scan line period to produce said preceding signal composed of the delayed main signal,
discrimination means for receiving said input signal, said main signal and said preceding signal for producing first, second and third discrimination signals,
control signal generating means for generating first and second control signals in response to said first, second and third discrimination signals, and
a selection circuit means for receiving said input signal, said main signal and said preceding signal and controlled by said first and second control signals for selecting said main signal in response to a first state of said first control signal, and for selecting either said preceding signal or said input signal in accordance with said second control signal and a second state of said first control signal.

* * * * *